J. FLEURY.
CORNER FEED BOX.
APPLICATION FILED MAY 14, 1912.
1,047,777.
Patented Dec. 17, 1912.
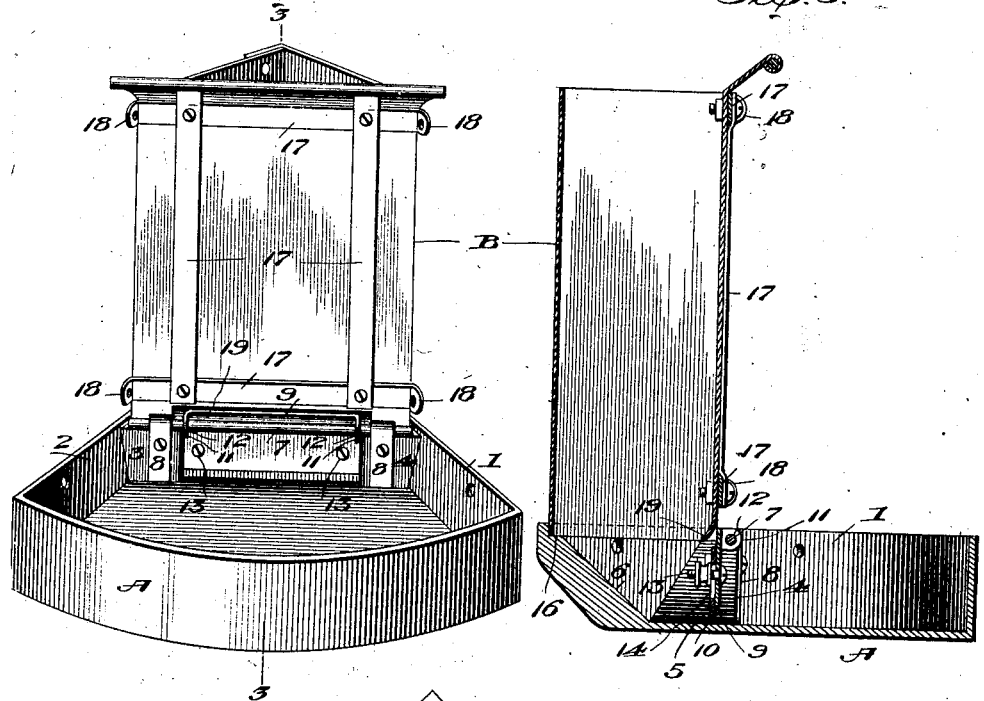
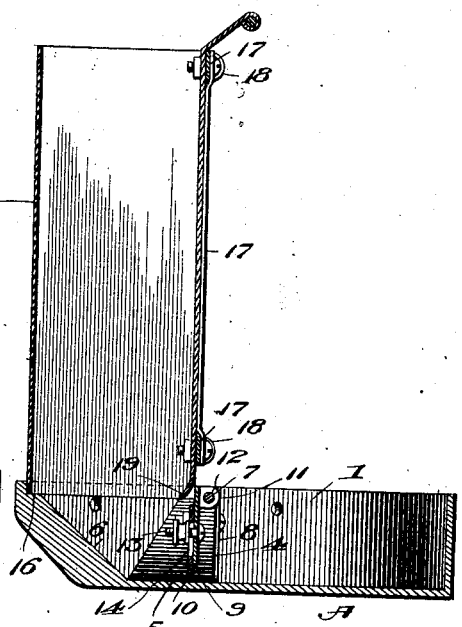
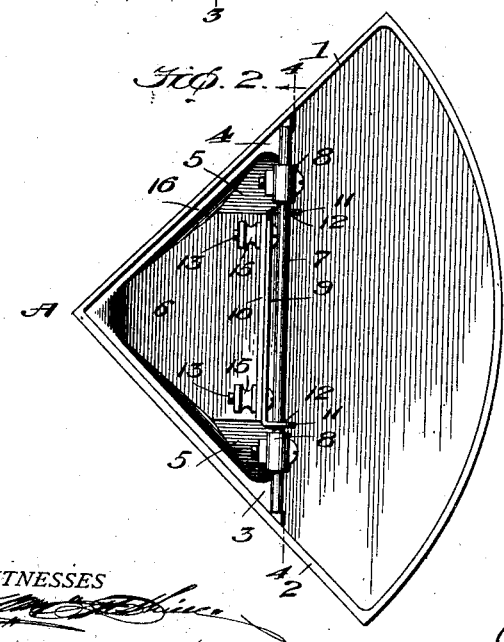
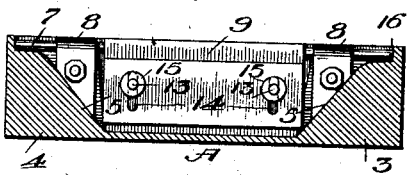
WITNESSES
INVENTOR
James Fleury

UNITED STATES PATENT OFFICE.

JAMES FLEURY, OF LINDSAY, ONTARIO, CANADA.

CORNER FEED-BOX.

1,047,777. Specification of Letters Patent. Patented Dec. 17, 1912.

Application filed May 14, 1912. Serial No. 697,284.

*To all whom it may concern:*

Be it known that I, JAMES FLEURY, a subject of the King of Great Britain, residing at Lindsay, county of Victoria, Province of Ontario, Canada, have invented certain new and useful Improvements in Corner Feed-Boxes, of which the following is a specification.

My invention relates to an improvement in corner feed boxes, and the object is to provide a feed-box for horses and other stock in which a valve adapted to be operated by the pressure of the nose of the animal while eating controls the supply of feed from the feed-hopper to the feed-trough.

A further object is in forming the valve of two leaves or sheets of metal which are adjustable in such a manner that the supply of feed to the trough is regulated, and in the provision of a sloped conductor for conducting the feed to the said valve.

This invention still further consists in certain other novel features of construction and combinations of parts which will be hereinafter fully described and pointed out in the claim.

In the accompanying drawings:—Figure 1 is a view in perspective of my invention, Fig. 2 is a top plan view of the feed-trough showing the valve in position, Fig. 3 is a sectional view on the line 3—3 of Fig. 1, and Fig. 4 is a vertical sectional view taken on line 4—4 of Fig. 2.

The feed-trough A is made preferably sector shaped in top plan view with the sides 1 and 2 (which are attached to the wall of the stall or in any other corner where it is desired to place the box), disposed at right angles to each other. This feed-trough is made preferably of cast metal, and has the diagonally-disposed partitions 3 and 4 extending from the sides 1 and 2 in such a manner that an opening is provided from the corner of the trough to the larger portion in the approximate center. The bottom of the trough in the immediate rear of the partitions 3 and 4 is sloped from the sides 1 and 2 as at 5, in such a manner that any grain or other matter falling upon this surface will be thrown behind the opening, and the bottom at the juncture between the sides 1 and 2 is sloped toward the opening as at 6. A rod 7 is secured to the top of the partitions 3 and 4 by straps or clips 8 and extends across the opening.

A valve is composed of two leaves or sheets of metal 9 and 10, the upper of which is provided with ears 11, 11, which are bent forwardly from the ends thereof and provided with openings 12 which are received around the rod 7, thus pivoting the valve to this rod in the openings between the partitions. The upper leaf 9 is provided near the lower edge thereof with openings in which screw-bolts 13 are received, and the lower leaf 10 has slots 14 in the upper edge in position to engage over the bolts and be held by the thumb-nuts 15 on the inner ends thereof.

A seat 16 is formed on the upper edges of the sides 1 and 2 in the rear of the partitions, and in this seat is received the hopper B which is constructed of sheet-metal and is in the form of a right angular triangle in top plan. The hopper B has secured to its front side longitudinal and vertical strengthening bars 17, and the ears 18 are provided on the outer ends of the longitudinal bars in position to receive screws for fastening the hopper to the wall. The lower edge of the front of the hopper immediately above the opening in the partitions is cut away and bent rearwardly as at 19 for a short distance, and in this way it provides for free movement of the valve 9. The valve, which closes by gravity, has the lower leaf 10 made of sufficient length that the ends abut against the outer edges of the partitions and on the rear side thereof.

It will thus be seen that I have provided a feed-box composed of few parts, economically and strongly constructed, in which the grain or other feed is positively conducted to the opening from the hopper to the trough; and in which the valve controlling this opening, which is actuated by the nose of the horse, is adjustable to regulate the passage of feed, and thus prevent the horse from wasting the feed by pushing it over the side of the hopper, or from bolting the feed, or slobbering due to an attempt at bolting.

Having fully described my invention, what I claim as new and desire to secure by Letters Patent, is:—

A feed-box comprising in combination a feed-trough and a hopper terminating at its lower end in the rear of the trough, partitions dividing the trough from the lower end of the hopper and having an opening between their inner ends, a rod mounted on the upper edges of said partitions, a valve pivoted on said rod, the sides of the hopper adjacent to the partitions being sloped to the opening and having a seat formed on their upper edges, and a sheet-metal hopper received in said seat.

In testimony whereof I affix my signature, in the presence of two witnesses.

JAMES FLEURY.

Witnesses:
LEIGH R. KNIGHT,
AGNES R. PRESTON.